April 17, 1951     P. F. MITTERWAY     2,549,382
BRAIDED DRIVING BELT

Filed July 22, 1949

INVENTOR.
Philip F. Mitterway
BY
Clifton C. Hallowell

Patented Apr. 17, 1951

2,549,382

UNITED STATES PATENT OFFICE 2,549,382

BRAIDED DRIVING BELT

Philip F. Mitterway, Prince Bay, N. Y., assignor to The S. S. White Dental Manufacturing Company, a corporation of Pennsylvania Application July 22, 1949, Serial No. 106,129

3 Claims. (Cl. 87—13)

My invention relates particularly to machine driving belts and is directed more specifically to endless belts of the type employed especially in connection with dental engines for transmitting motion from a driving pulley to a driven pulley serving to rotate burs, drills, disks, etc.

In the actuation of such apparatus, it is of the utmost importance that the connected ends of the driving belt when passing over the multiplicity of pulleys including the driving pulley keyed to the armature shaft of the motor and the driven pulley mounted on the spindle which is carried by the hand piece do not impart detrimental vibrations to the hand piece, and consequently to the bur or implement attached to the spindle.

The principal objects of my invention are to provide a novel method of connecting the ends of a machine driving belt employed in actuating apparatus of the type above contemplated, and to form a spliced joint that will be strong, durable and flexible, and not likely to impart objectionable vibrations to the machine and the hand piece unit, connected thereto, while in operation.

Other objects and advantages of my invention relate to the specific means of producing the splice, and will appear from the following detailed description.

My invention also includes all of the various novel features of construction and arrangement as hereinafter more definitely specified.

Figure 1:
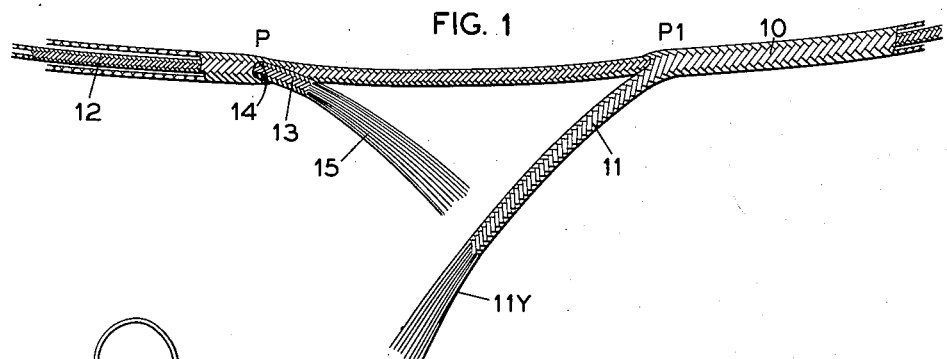
Figure 2:
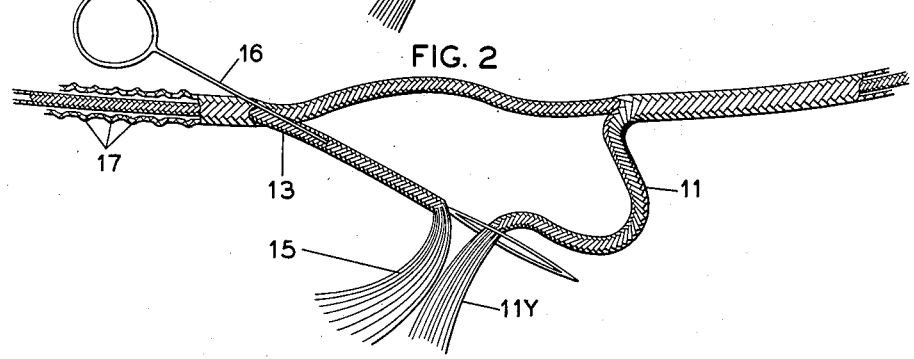
Figure 3:
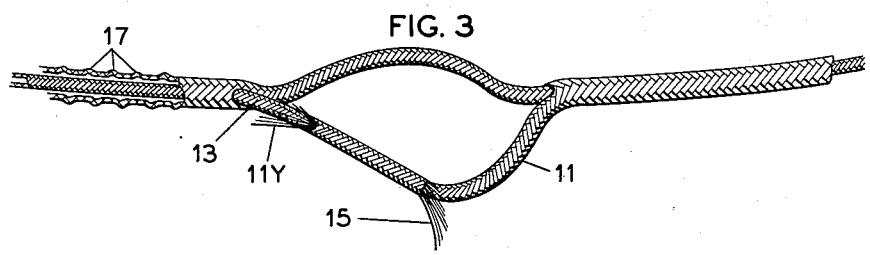
Figure 4:
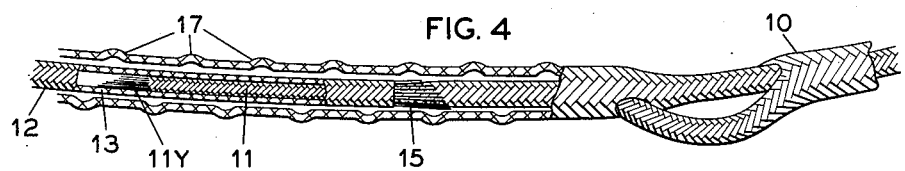
Figure 5:

In the accompanying drawings, Figure 1 is an elevational view showing a portion of a braided machine belt ready for the making of the connecting splice joint, the outer disposed covering or sleeve being shown partly in vertical longitudinal section, for convenience of illustration; Fig. 2 is a similar view showing the outer covering retracted from the position shown in Fig. 1 so as to uncover one end of the core, and showing a tool in the form of a slitted needle in position in the uncovered core portion for drawing another core portion which is formed at the opposite end of the covering in telescopic relation with the interior of the uncovered core portion; Fig. 3 is a similar view showing the core portion formed with the outer covering, telescopically engaged longitudinally within the previously uncovered core portion, the outer covering being shown at one end in longitudinal vertical section; Fig. 4 is an enlarged side elevational view of the belt showing the joint portion drawn partly over the two telescoped core portions of the belt with a portion of the outer covering being shown in section; and Fig. 5 is an elevational view of the completed joint showing the ends of the outer covering brought into abutted relation against each other to form the completed endless belt.

In said figures, the machine driving belt to which the connecting or splicing method of my invention is particularly well adapted for use as shown in Figure 1, consists of a braided outer disposed covering or sleeve 10 providing but for a relatively small length as indicated between the points P and P1, a complete annulus. The sleeve 10 at point P1 emerges into the form of a contiguously braided hollow core portion 11, the end of which in turn terminates in an unravelled portion 11Y, with the threads fanned out.

The opposing end portion of sleeve 10 from point P is reduced in diameter to be connected with the hollow core 12, extending in position concentric to the sleeve 10 and protruding through an opening 14, at point P to form the core end portion 13 normally extending a relatively small length to terminate like core 11 with the unravelled thread portion 15 thus forming, in cooperation with the covering or casing 10, a helix or loop in concentric relation to each other.

According to the method of joining the ends of the machine belt constructed as above described, the core portion 13 is uncovered for a suitable distance by retracting the outer covering, as best seen in Figs. 2 and 3, to cause the latter to form a series of annular corrugations 17.

A tool 16, which is in the form of a slitted needle, is then inserted into this core 13 to the position as shown in Fig. 2 when the unbraided threads 11Y of core portion 11 are engaged in the slit of the needle for drawing this core portion 11 longitudinally into the core portion 13 in position as shown in Figs. 3 and 4, which action is followed by cutting off the unbraided thread ends of core portion 11Y to approximately one-half inch from its braided portion in staggered relation to each other, then by slightly withdrawing the core 11 from the end portion of the sleeve 13 an amount sufficient to position or locate all its unbraided threads into the sleeve end portion 13, as best shown in Fig. 3 when the unbraided threads 15 at the end portion of the core 13 are cut in a staggered relation to each other so as to avoid any sharp difference in diameter along the length of the completed spliced joint.

The end of the sleeve portion 10 adjacent to the uncovered core portion 13 is then pulled longitudinally over the now telescoped core end portions 11 and 13, as shown in Fig. 4, which causes the sliding telescopic movement of the sleeve 10 to a point limited by the intersections formed by the core portions 11 and 13 at points P and P1, thus forcing the terminating ends of sleeve covering 10 into closely abutted relation against each other, whereby forming a spliced joint which is substantially invisible to the naked eye, and of a diameter substantially uniform throughout the length of the belt, and which is smooth and comparatively stronger than the unspliced portion of the belt.

I do not desire to limit my invention to the precise details of construction and arrangement as herein set forth, as it is obvious that various modifications may be made therein without departing from the essential features of my invention as defined in the appended claims.

Having thus described my invention, I claim:

1. The method of connecting the opposed ends of a helix formed machine belt having a core and a braided sleeve covering concentrically disposed to each other, one end of the core protruding through the sleeve at a point adjacent another core portion formed at the opposite end of the sleeve, the step in said method which consists in uncovering one end of the core by retracting a given length of the braided covering, puncturing the uncovered portion of the core with a tool in the form of a slitted needle, passing any unbraided threads of the core portion which is formed with the outer end portion of the covering into the slit of the needle and telescopically engaging the latter core into the uncovered portion of the core by retracting the needle.

2. The method of connecting the opposed ends of a helix formed belt having a contiguously formed core and a braided sleeve disposed in concentric relations to each other, the second step in said method which consists of cutting any unbraided threads from both ends of the core portions in staggered relation to a length substantially half the distance of the uncovered core portion and withdrawing the threads of the inner disposed core into the outer disposed core portions for progressively decreasing the outer diameter of the telescoped core portions.

3. The method of forming a connection between the opposed ends of a helix coiled belt having a contiguously formed braided core and a sleeve disposed in concentric relation to each other, the steps in said method consisting in uncovering the end of the core a given length by retracting the outer braided covering, puncturing the uncovered portion of the core a given distance from its free end by inserting a tool in this portion of the core in the form of a slitted needle, engaging the unbraided threads at the end of another core portion which is formed at the opposite end of the sleeve into the slitted portion of the needle, withdrawing the needle for telescopically engaging such core into the uncovered core portion starting from the free end of the latter, cutting the unbraided threads from both ends of the core portions in staggered relation, withdrawing the inner core to locate its unbraided threads into the outer disposed core portion, and pulling the retracted portions of the outer covering over the joint to a point wherein the intersections formed by one of the core portions and the ends of the outer covering are in tight abutment against each other.

PHILIP F. MITTERWAY.

REFERENCES CITED

The following references are of record in the file of this patent:

UNITED STATES PATENTS

| Number | Name | Date |
|---|---|---|
| 296,377 | Atwood | Apr. 8, 1884 |
| 338,216 | Atwood | Mar. 16, 1886 |